United States Patent
Bloecher et al.

(10) Patent No.: US 7,606,563 B2
(45) Date of Patent: Oct. 20, 2009

(54) DISTRIBUTED TELEPHONE CONFERENCE WITH SPEECH CODERS

(75) Inventors: Peter Bloecher, Nürnberg (DE); Karl Hellwig, Wonfurt (DE); Matthias Rychetsky, Mühltal (DE); Matthias Doerbecker, Ettlingen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 534 days.

(21) Appl. No.: 10/503,778

(22) PCT Filed: Feb. 6, 2002

(86) PCT No.: PCT/EP02/01231

§ 371 (c)(1),
(2), (4) Date: May 2, 2005

(87) PCT Pub. No.: WO03/067865

PCT Pub. Date: Aug. 14, 2003

(65) Prior Publication Data

US 2007/0067158 A1    Mar. 22, 2007

(51) Int. Cl.
*G06F 15/00* (2006.01)
(52) U.S. Cl. .................................. 455/416; 370/349
(58) Field of Classification Search .......... 455/416, 455/417, 422, 561; 370/349, 491; 375/219
See application file for complete search history.

(56) References Cited

U.S. PATENT DOCUMENTS

| 4,920,565 | A |   | 4/1990 | Steer |
|---|---|---|---|---|
| 5,276,678 | A |   | 1/1994 | Hendrickson et al. |
| 5,742,930 | A | * | 4/1998 | Howitt ........................ 704/502 |
| 6,078,809 | A |   | 6/2000 | Proctor |
| 2003/0032414 | A1 |   | 2/2003 | Melaku et al. |
| 2004/0160940 | A1 | * | 8/2004 | Kim ........................... 370/349 |

FOREIGN PATENT DOCUMENTS

| EP | 0 435 032 | 7/1991 |
|---|---|---|
| EP | 0435032 | 7/1991 |
| JP | 7245664 | 9/1995 |

* cited by examiner

*Primary Examiner*—Sam Bhattacharya

(57) ABSTRACT

In order to simplify the setup of telephone conference with distributed conference devices, each conference participant applies speech encoding to its own speech signal in order to reduce the bandwidth of its speech signal thus that the bandwidth compressed speech signal shows at least half of the bandwidth of the data transport channel. Each compressed speech signal is inserted to the data transport channel and that each conference participant extracts the compressed speech signals of the other parties from the data transport channel. Each participant then decodes the compressed speech signals and each conference participant sums up all decoded speech signals to a sum signal.

25 Claims, 4 Drawing Sheets

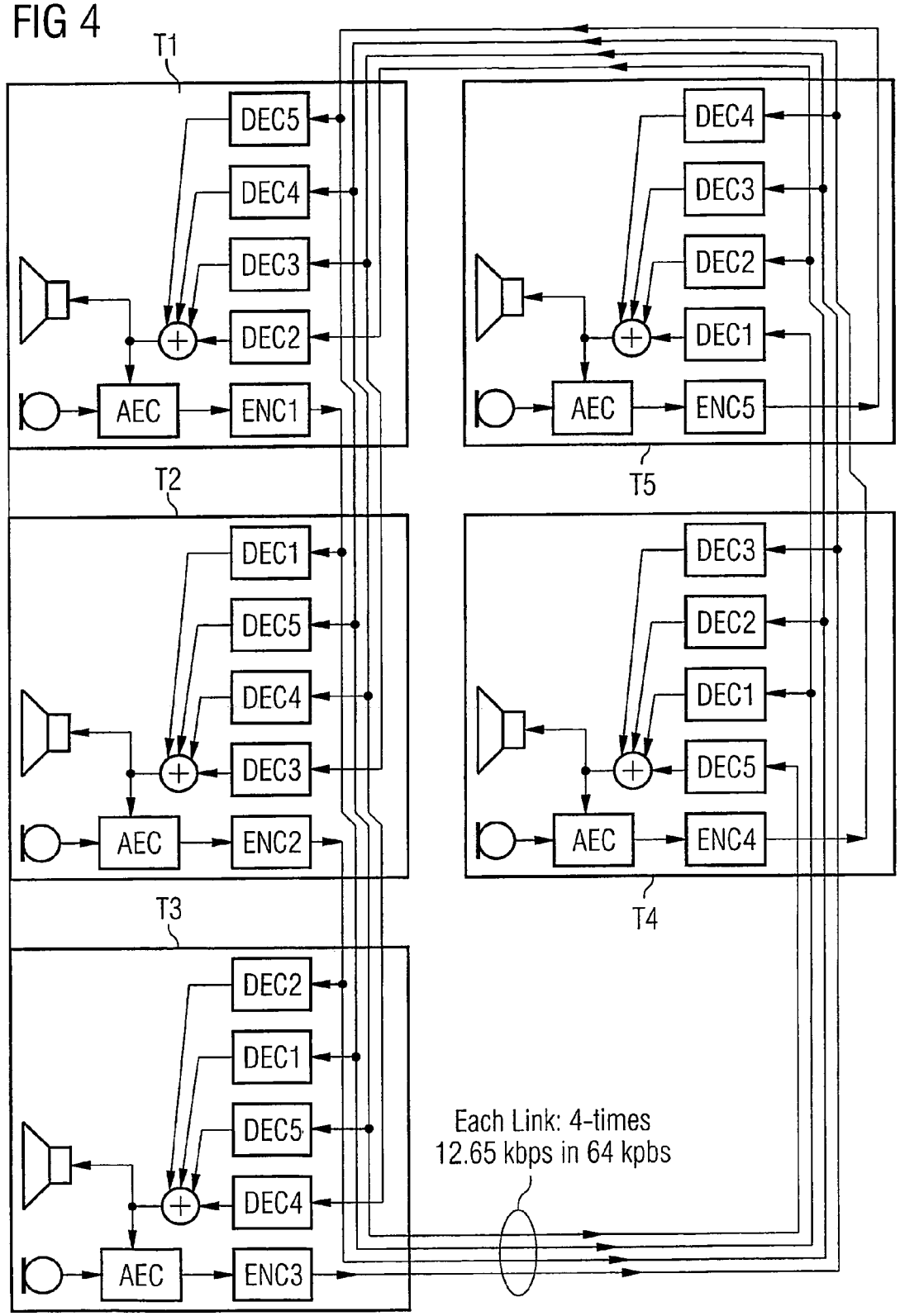

DISTRIBUTED TELEPHONE CONFERENCE WITH SPEECH CODERS

FIELD OF THE INVENTION

The present invention relates to telephone conference system.

DESCRIPTION OF THE PRIOR ART

Today multi-party telephone conferences in telecommunication networks are realised with centralized conference devices, where three or more conference partners can call in and can communicate with the whole group. The centralized conference device distributes to each conference party the sum signal of the other parties.

Also known are conference systems, which do not need a centralized conference device. For example from U.S. Pat. No. 5,276,6768 a communication system having full processing capabilities in the user ports is known, where each port is connected to a TDM collection bus and a TDM distribution bus. A bus controller terminates the collection bus on which voice words are deposited in time slots by the respective user port, the voice words being realigned and transmitted by the bus controller on the TDM distribution bus. Each user is assigned a time slot and can thus communicate simultaneously with one or more other user ports, such as during a two-way telephone conversation or a multiple party conference. A memory in each user port combines plural voice words obtained from respective TDM time slots of conference participants, and combines such voice words into a composite signal representative of all the other conferees. The conference circuit of each user port combines the voice words of all the other participating ports over a frame period, except its own voice word, and thus the composite voice word of each user port is different. However in such a bus structured conference systems the number of conference participants is limited by the number of parallel transport channels (which in this system is the number of timeslots).

U.S. Pat. No. 6,078,809 already describes a method and an apparatus for performing a multi party communication in a communication system. In this patent, speech signals encoded by a first party are transmitted to the other parties. Each party has two decoders, which each receive one of the encoded signals, and a combiner to combine the decoded speech signals for output to the user. However, again the number of conference participants is limited by the number of parallel transport channels.

From JP7245664 a telephone conference system is known which affords only two transport channels to build up a conference with an unlimited number of participants. As transport channels the two B-channels of an ISDN system are used. The conference is set up in that the ISDN terminals are connected such that they form a chain connection where data is exchanged in two counterrotating rings. The first party calls the second party on one of its B-channels. As the second party is connecting with the first party on one of the two B-channels the second party can call the third party on the other B-channel and so on. The last party of the conference call calls the first party on the second B-channel thus closing the chain. Every party is now connected with two other parties. By means of a conference circuit in each terminal only the own speech signal or the sum of the own speech signal and a (sum) signal received from one of the directly connected party is transmitted to the other direct connected party. By this every the conference circuit at each party terminal is enabled to build from the two received (partial sum) signals the sum signal of all the other parties. By this solution a simultaneous contact and a telephone call is attained with inexpensive terminal equipment and without the use of a centre equipment.

The rules how the data is distributed by the conference circuit seems to depend on the location in the chain. If one channel is interrupted, some parties will not be heard by other parties.

SUMMARY OF THE INVENTION

The object of the invention is to strive for a more simple solution.

This object is achieved in that that each conference participant applies speech encoding to its own speech signal in order to reduce the bandwidth of its speech signal thus that the bandwidth compressed speech signal shows at maximum half of the bandwidth of the data transport channel. Each compressed speech signal is inserted to the data transport channel and each conference participant then extracts the compressed speech signals of the other parties from the data transport channel. Each participant decodes the compressed speech signals and each conference participant then sums up all decoded speech signals to a sum signal.

By encoding the speech signals it is possible to transport in one data transport channel more than one speech signal. As each participant is provided with each original speech signal of each other participant, the sum signal can be easily built by summing up these separate signals. As separate signals of each participant are present, it is also possible to build a spatial signal. By means of the spatial (stereophonic) replay, it is easier to distinguish between different speakers. As each signal of each conference party is provided separately, the user may pose the voices independently from each other according to his own preferences.

In contrast to prior art systems, the number of transport channels is lower than the number of parties. Also it is not necessary to build up a closed chain of connections.

Since after a closed chain of connection is formed, (e.g. every party is connected with two other parties and the encoded speech signals are send forward and backward at the same time) the closed chain provides redundancy. If the chain is interrupted by accident anywhere in-between two parties, all parties still can communicate with each other. Only if a second interruption occurs the conference calls splits up into two subgroups having no communication possibilities between the two subgroups. Therefore in case of an interrupted connection, the interruption should be closed as soon as possible.

BRIEF DESCRIPTION OF THE DRAWINGS

In the following the invention will be further described according to the figures and by means of examples
FIG. 4: Five-party conference call with closed ring

DETAILED DESCRIPTION OF THE DRAWINGS

Figure 1:
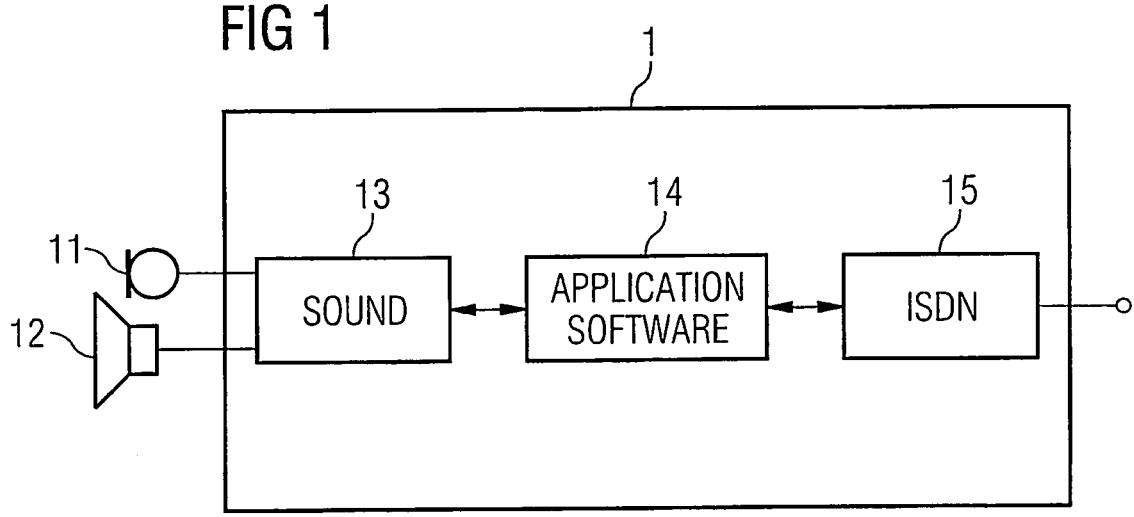
FIG. 1: Terminal for a Conference call (Personal Computer)

First a preferred embodiment of a terminal that incorporates the invention is described. Originally a personal computer 1 has been chosen as a terminal to set up a demonstration model in a very short time. As a voice interface between a user and the personal computer 1, a sound system 13 is used.

Many personal computers nowadays have such sound system 13 on board. If such an on board sound system is not provided or, for reasons of better quality an additional sound system extension cards may be used. A microphone 11 and one or more loudspeakers 12 are plugged to the chosen sound system interface. Alternatively also a so-called headset with a microphone attached to headphones may be used. As for the data transport channel in this example, in order to rely on the wide spread ISDN, the personal computer 1 maybe equipped with an ISDN adapter 15. A telephone conference application software, in the sequel referred to as the application software 14, controls the exchange of data between the sound system 13 and the ISDN adapter 15 and thus provides the personal computer with the functionality of a telephone conference terminal. It should be noted that standard software drivers for the sound systems and the ISDN adapter are sufficient to communicate with the application software. No changes to driver software need to be made.

The microphone 11 is used to digitise analogue voice signals uttered by the user into digital samples. The application software 14 encodes the digital samples by means of a speech encoder (software). In order to take advantage of the invention, the encoding gain must be at least 50%. That means the data rate of the encoded speech signal must be at maximum the half of the data rate of the non-encoded speech signal (for a three-party conference). Thus, a usual speech channel can be used to hold two encoded speech signals. In the meantime, there is a variety of speech encoders, also used in mobile communication systems to improve the capacity of such a system. Up-to date encoders provide a data rate of 12.65 kbps with nearly the same quality (so called wideband codecs) as un-coded speech on ISDN using uses 64 kbps. By means of such a wideband codec, four encoded speech signals can be transported via a standard ISDN B-channel.

For other parties of a conference, an appropriate decoder (software) must be provided. However it is not a pre-requisite that all parties must use the same encoder. The type of decoder, which is used by each party, may be negotiated when the conference call is initiated.

Figure 2:
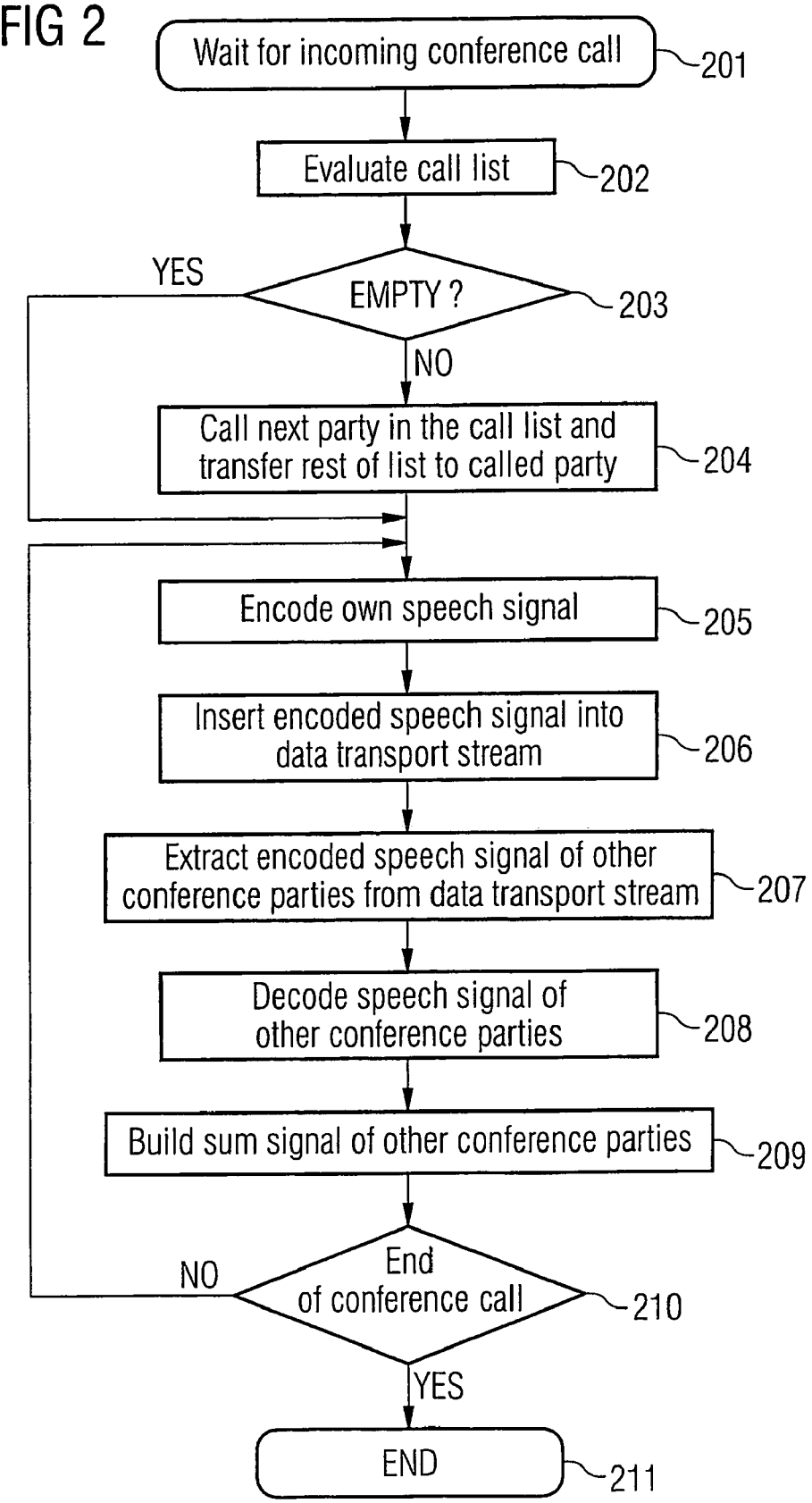
FIG. 2: Steps to perform conference call

FIG. 2 now shows the steps performed by the application software 14. In the embodiment of the invention, the application software has to be started by the user if he wants to set up a conference call or if he is waiting (step 201) to participate in a conference call. In a preferred embodiment, the initiator of a conference call first compiles a list of all conference parties with their caller identification. Preferably this list is sorted in an order, e. g. by means of the country codes and city codes so that all parties will be connected in a way that minimizes the delay between the first and the last party of the conference call. Although the list may only contain the parties that are not already part of the conference call, it may be advantageous to send the complete list and just mark the parties that already have joined the conference. Thus every conference party has a full set of information on the other conference parties. This information may be used to display status information on the other parties or to close the line of conference parties if one party in-between leaves the conference call and the other parties want to proceed with the conference call.

This list is sent, for example, to the first party in the list that is not marked, (e.g. is not a party of the conference call so far). Also additional information may be added to that list (e.g. the type of speech encoder that is used by a specific party).

The application software of a party that is waiting for a call accepts an incoming call and evaluates the received conference list. If there is no list, a usual two party call is established. If there is a list the list, is evaluated by the application software (Step 202). The terminal marks itself in the list as having joined the conference. If all parties in the list are marked (that means the list in this sense is empty as no further parties to be called are provided; decision box 203) no further party has to be invited to a conference call and the terminal may start immediately with the conference (step 205). Otherwise the terminal sets up a call to the next party in the list (step 204).

In the conference mode, the terminal encodes its own speech signal (step 205) and inserts the compressed speech signal into the data transport channel. Then all compressed speech signals of the other parties are extracted from the data transport channel (step 207) and are decoded (step 208). After all speech signals have been decoded, e. g. into PCM signals, the sum of all signals is built (step 209) and is output via the loudspeakers or headphone respectively. Of course additional processing like a spatial distribution of each party for stereophonic replay as known in prior art may be applied.

The steps of encoding and decoding (205-209) preferably are performed at the clock rate of data transport channel (e. g. in ISDN at a clock rate of 8 kHz). As long as the conference call runs, (decision step 210) these encoding and decoding steps (205-209) are repeated in a loop. If the conference call is closed, the application may be terminated (step 211) or alternatively may return to the wait state (201).

Figure 3:
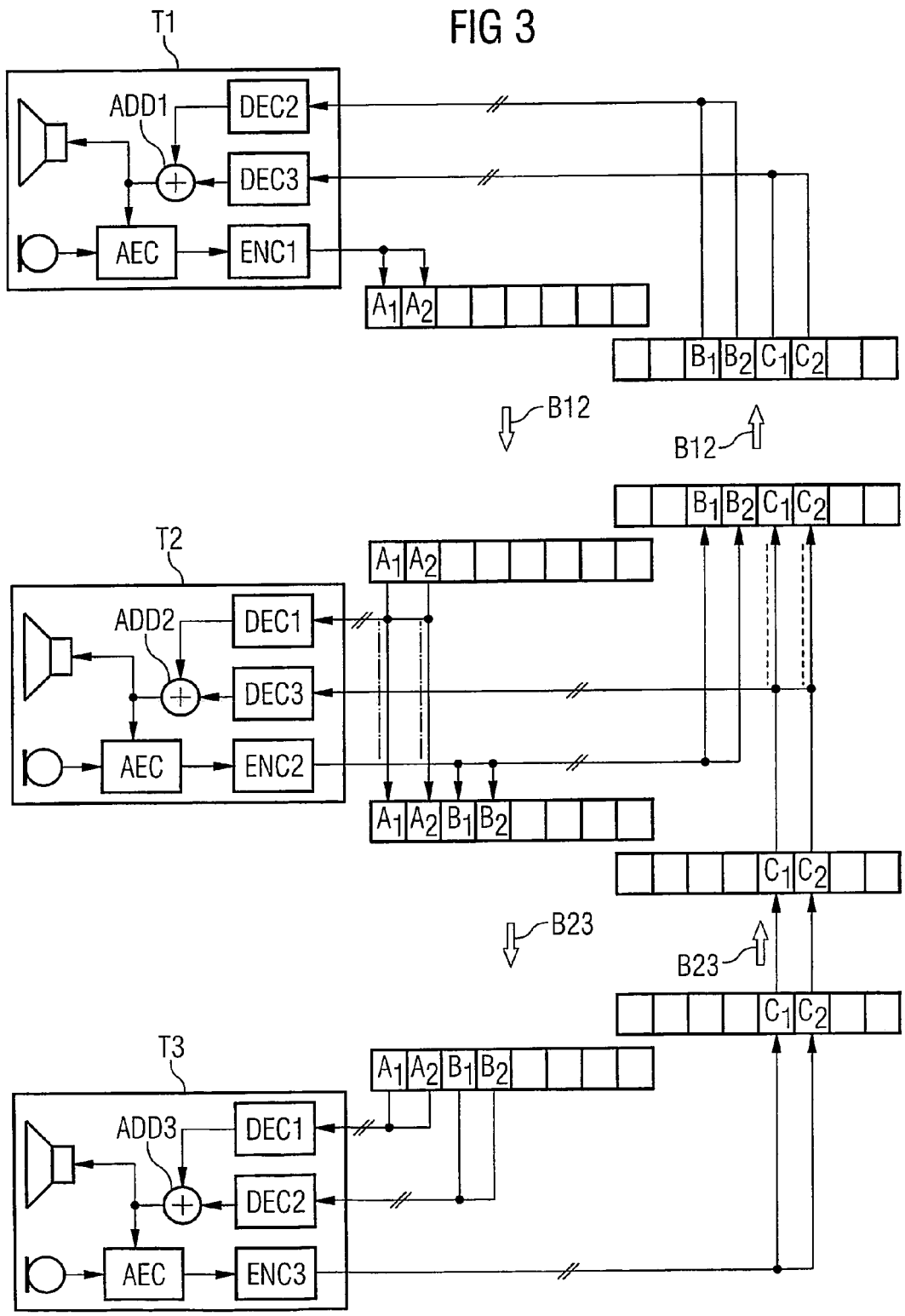
FIG. 3: Three-party conference call

FIG. 3 shows a teleconference call with three parties T1, T2, T3 based on ISDN as data transport channels. When the conference call is established, the first party is connected with the second party T2 via a single ISDN B-channel $B_{12}$. The third party T3 is connected with the second party T2 also via a single ISDN B-channel $B_{23}$. Thus only the second party T2 "in the middle" makes use of both of its two B-channels $B_{12}$, $B_{23}$. The ISDN channels provide data bytes with a bit width of 8 bit at a clock rate of 8 Khz in each direction. In FIG. 3 the ISDN B-channels of each direction are symbolized by one data word. In this example it is assumed that the conference parties use speech encoders ENC1, ENC2, ENC3 that compress speech to a data rate of 16 kbps at a maximum. If the encoded speech signals are sent continuously, only two data bits at a clock rate of 8 kbps are necessary to transport all output data of each encoder. If the clock rate is lower, fill bits may be used to achieve the appropriate data rate. If encoders with a data rate equal or less than 8 kbps is available only one of the eight bits of each byte must be used thus raising the number of possible conference parties to nine.

The terminal Ti of the first party produces for every encoded sample two bits A1, A2. These bits are inserted into the ISDN signal that is sent to the terminal T2 of the second party. The second party extracts these two bits $A_1$, $A_2$ and feds them into its first decoderDEC1. Switching means (not shown) copies these two bits (dashed line) to the data word of the second ISDN line $B_{23}$. The two output data bits $B_1$, $B_2$ of the encoder ENC2 of the second terminal T2 inserts these two bits into the data word of the second ISDN line that is sent in direction to the terminal T3 of the third party. Thus the terminal T3 of the third party receives the two encoded bits $A_1$, $A_2$ of terminal T1 and the two encoded data bits $B_1$, $B_2$ of the second terminal T2. Thus the third terminal is able to build the sum signal in a conference means (ADD1) of the two other conference parties. Its own encoded data bits $C_1$, $C_2$ are sent back to the second terminal T2. The second terminal T2 feds these two encoded data bits of the third terminal T3 to a decoder DEC3. The data bits $C_1$, $C_2$ are also copied (dashed line) to the first ISDN line $B_{12}$ directed to the first terminal T1. Also the output bits of the encoder ENC2 of the second terminal are inserted on the third and second position of the data word that is sent to the first terminal T1.

In this embodiment, every sample has its fixed position in the data word of the ISDN signal. The person skilled in the art will readily appreciate that also other arrangements of the encoded data bits are possible, e. g. that in each terminal the position of the data bits is rotated by two positions. By this, the own data bits are always inserted at the same position (e. g. in the first two or the last two positions) which will make it easier to assign the data bits to the appropriate decoders at each terminal.

For sake of completeness, FIG. 3 shows that acoustic echo cancellers AEC are provided in each terminal. As the use of acoustic echo cancellers is common knowledge for a person skilled in the art, no detailed description is necessary. The use of the echo canceller is superfluous if headphones are used.

Although a three party conference may be established in known manner with two ISDN lines by sending the parties sum signals, the advantage of this embodiment is that each party receives for each party a separate signal. This can be used for further processing like for spatial arrangements or for individual filtering.

FIG. 4 shows another embodiment of the invention with a five party conference call. For better readability, only the virtual data connections between the terminal are depicted; each line representing the transmission of two encoded data bit at a given sample time. In addition to the embodiment of FIG. 3, the last terminal T5 of the conference party calls the first party T1 thus closing the chain. Thus all parties have identical roles and show identical behaviour. No distinction needs to be made to determine where a particular party is at the end of a line or is in the middle. As it can be seen from FIG. 4, with conventional ISDN interfaces, both B channels are occupied, but each in "forward" direction only. The "backward" direction is unused. By also using the backward direction, the number of conference parties may be doubled (e. g. every odd terminal sends forward and every even terminal sends backwards). Another possibility is to send the encoded samples in both directions to minimize the delay times between the parties.

The majoring number of conference calls does not exceed calls with more than five parties. However if more than five party calls are necessary, additional measures like silence suppression for non-active parties may be applied to involve more parties.

Typically the speech encoder is much more complex in terms of necessary processing power than the speech decoder. As for the invention needs only one speech encoder, the added processing requirements for the additional speech decoders is negligible with the prevailing processing power of up-to-date personal computers, (i.e. laptops).

For the data transport channel, reference has been made to ISDN fixed lines as this seems to be the most wide spread transport medium for this application. Of course the invention is not restricted to ISDN channels. Also TDM signals may be used whereby the parties of a conference call share each time slot. Also applications with terminals for mobile communications are possible if calls to two parties can be established at the same time.

Another advantage of the invention is that if the users of a conference call distribute speech encoder (software) among themselves, they can use their own speech encoder software. So they can easily update to newest technology available. In case of a centralized conference device, the device limits the capabilities of a conference call. So the users of a conference call do not have the chance to benefit from better speech encoders as long as the network operator or who ever is in charge of the centralized conference device is not willing to update the type of speech encoders he offers for parties who call in. As the user of the decentralized conference call can use their own speech codecs, it is also possible for them to use their own encryption methods.

Although the invention has been described by means of a personal computer, the person skilled in the art will readily appreciate that it is just a matter of time when signal processors and circuits with sufficient computing power will be available at lowest costs to integrate the invention into wired telephones for public and private switched networks or to integrate the invention into terminals for mobile communication. All, the encoders and decoders have been referenced as speech coders. Speech coders are to be understood to provide best quality for voice signals. However any other suitable acoustic encoders should be understood under this term, (e.g. encoders specialized for on line music compression as long as the same benefits are achieved).

Furthermore, it has to be mentioned again that the invention is not restricted to the specific embodiments and examples described in the present invention. That is, on the basis of the teaching contained in the description, various modifications and variations of the invention may be carried out.

The invention claimed is:

1. Method to participate in a teleconference with access to at least two data transport channels, said method comprising the steps of:

speech encoding is applied by each conference party on its own speech to reduce the bandwidth of its speech signal, wherein said bandwidth of the compressed speech signal is at maximum half of the bandwidth of one of the at least two data transport channels;

each compressed speech signal is inserted to a selected data transport channel of the at least two data transport channels, wherein the selected data transport channel is used to transmit both compressed speech signals;

each conference participant extracts the compressed speech signals of the other parties from the selected data transport channel;

each participant decodes the compressed speech signals; and each participant sums up all of said decoded signals to generate a sum signal.

2. Method according to claim 1, wherein the sum signal is processed spatially.

3. Method according to claim 1 wherein the speech encoder for said speech encoding is chosen independently by each participant.

4. Method according to claim 1, wherein the encoded speech signals are sent in both directions at the same time.

5. Telecommunication device with conference capabilities where a speech signal is sent to other conference parties on a data transport channel, comprising:

a conference means for building a sum signal of speech signals received from the other conference parties;

a speech encoder to encode each party's own speech signal into a compressed speech signal, wherein the bandwidth of each compressed speech signal is at maximum, half of the bandwidth of the data transport channel;

a data insertion means for inserting the compressed speech signal into a data stream, whereby the compressed speech signal is inserted into a single data transport channel useable to transmit a plurality of compressed speech signals;

a data extraction means for extracting compressed speech signals from the received data stream; and at least two speech decoders to decode the extracted compressed speech signals into decompressed speech signals for processing in the conference means.

6. Telecommunication device according to claim 5 wherein the telecommunication device is a computer.

7. Telecommunication device according to claim 6, wherein a sound system of the computer is used for generating the speech samples and to reproduce the conference sum signal, and that encoding means and decoding means are carried out by software routines communicating with the sound system of that computer.

8. Telecommunication device according to claim 5 wherein the telecommunication device is a telephone.

9. Telecommunication device according to claim 5 wherein the telecommunication device is a telephone for mobile communication.

10. A telecommunication system for establishing a teleconference between a plurality of participants where every conference participant applies speech encoding to its own speech and transmits its own compressed speech signal via a single data transport channel to the other conference participants and wherein each participant receives the compressed speech signals associated with all other participants within said teleconference, said system comprising:

means, for each conference participant, for extracting the compressed speech signals of the other participants from the data transport channel, wherein the bandwidth of such compressed speech signals associated with each participant is at maximum half of the bandwidth of the respective speech signal, and wherein at least one data transport channel is used for the transmission of two or more compressed speech signals;

means, for each participant, for decoding the extracted compressed speech signals associated with each of said all other participants; and means, for each participant, for summing up all of said decoded signals to generate a sum signal.

11. The system according to claim 10, wherein the sum signal is processed spatially.

12. The system according to claim 10 wherein the speech encoder for said speech encoding is chosen independently by each participant.

13. The system according to claim 10 wherein the encoded speech signals are sent in both directions at the same time.

14. A method for establishing a teleconference between a plurality of participants where each conference participant applies speech encoding to its own speech and transmits its own compressed speech signal via a single data transport channel to the other conference participants and wherein each participant receives the compressed speech signals associated with all other participants within said teleconference, said method comprising the steps of:

extracting the compressed speech signals of the other participants from the data transport channel by each participant wherein the bandwidth of such compressed speech signals associated with each of said other participant is at maximum half of the bandwidth of the respective speech signal, and wherein at least one data transport channel is used for the transmission of two or more compressed speech signals;

decoding the extracted compressed speech signals associated with each of said all other participants; and summing up all of said decoded signals to generate a sum signal.

15. The method according to claim 14, wherein the sum signal is processed spatially.

16. The method according to claim 14 wherein the speech encoder for said speech encoding is chosen independently by each participant.

17. The method according to claim 14 wherein the encoded speech signals are sent in both directions at the same time.

18. The system according to claim 10, wherein each participant has access to at least two data transport channels.

19. The method according to claim 14, wherein each participant has access to at least two data transport channels.

20. The method according to claim 19, further comprising the step of forming a chain comprising all participants.

21. The method according to claim 20, wherein the number of participants exceeds the number of data transport channels.

22. The method according to claim 21, wherein the teleconference is established in an ISDN network, and both forward channel and backward channels are used as data transport channels.

23. Method according to claim 1, wherein each compressed speech signal is inserted to a selected data transport channel at a specified position in the selected data transport channel.

24. Telecommunication device according to claim 5 wherein the data insertion means inserts the compressed speech signal into a specified position in the data transport channel.

25. The system according to claim 10, wherein the means for each conference participant to extract the compressed speech signals of the other participants from the data transport channel includes means for extracting compressed speech signals of each conference participant from a specified position in the data transport channel.

* * * * *